United States Patent
Bury

(10) Patent No.: US 8,078,237 B2
(45) Date of Patent: Dec. 13, 2011

(54) MOBILE PHONE HOLDER WITH LATERAL CONNECTIONS, ESPECIALLY FOR A MECHANICAL VEHICLE

(75) Inventor: Henryk Bury, Mielec (PL)

(73) Assignee: BURY Sp. z o.o., Mielec (PL)

( * ) Notice: Subject to any disclaimer, the term of this patent is extended or adjusted under 35 U.S.C. 154(b) by 478 days.

(21) Appl. No.: 12/348,289

(22) Filed: Jan. 3, 2009

(65) Prior Publication Data
US 2009/0186666 A1    Jul. 23, 2009

(30) Foreign Application Priority Data
Jan. 20, 2008  (EP) .................................. 08460003

(51) Int. Cl.
*H04M 1/00* (2006.01)
(52) U.S. Cl. ................ 455/575.1; 455/569.1; 455/569.2
(58) Field of Classification Search ................. 455/90.1, 455/569, 347, 348, 550.1, 575.1, 569.1, 575.9, 455/573, 90.3, 557, 22; 379/445, 446, 455, 379/426, 433.13; 224/271, 269, 666, 929
See application file for complete search history.

(56) References Cited

U.S. PATENT DOCUMENTS

| | | | |
|---|---|---|---|
| 6,019,624 A | | 2/2000 | Garcia |
| 6,603,959 B1 * | | 8/2003 | Peiker ........................ 455/575.1 |
| 7,062,300 B1 * | | 6/2006 | Kim ........................... 455/569.1 |
| 7,319,887 B2 * | | 1/2008 | Mollinari ...................... 455/557 |
| 7,540,459 B2 * | | 6/2009 | Asano et al. ................ 248/309.1 |
| 7,684,838 B2 * | | 3/2010 | Wilson ........................ 455/575.9 |
| 7,801,572 B2 * | | 9/2010 | Bury | 
| 2001/0035445 A1 * | | 11/2001 | Kamiya ........................ 224/271 |
| 2002/0009195 A1 * | | 1/2002 | Schon ........................... 379/454 |
| 2002/0191782 A1 * | | 12/2002 | Beger et al. ................... 379/454 |
| 2003/0162510 A1 * | | 8/2003 | Kim ................................ 455/90 |
| 2004/0132343 A1 * | | 7/2004 | Bisplinghoff ................. 439/638 |
| 2006/0058070 A1 * | | 3/2006 | Chang ........................ 455/569.1 |
| 2009/0131131 A1 * | | 5/2009 | Wilson ........................ 455/575.9 |

FOREIGN PATENT DOCUMENTS

| | | |
|---|---|---|
| DE | 297 05 230 U1 | 10/1997 |
| DE | 10 2006 005 111 A1 | 8/2006 |
| EP | 1 835 706 A2 | 9/2007 |

* cited by examiner

*Primary Examiner* — Jean Gelin
(74) *Attorney, Agent, or Firm* — Matthias Scholl P.C.; Matthias Scholl

(57) ABSTRACT

A mobile phone holder with lateral connectors, especially for a mechanical vehicle, provided with a base (1) and a cover (4) and a slide (3), which is mounted slideably in the base and into which a mobile phone is inserted, the holder is provided with an unlocking module (2) with lateral buttons (15), which are connected to an eccentric wheel (17) and which, when pressed, unlock the mobile phone, wherein its slide (3) is provided with a power plug (9), mounted slideably in it, and having a casing (39) and pins (34), which are concurrently guided both along the guides (8) of the base (1) and the cover (4), the guides inclined towards the axis of the holder and along the guide (30) of the flat protrusion (29) of the holder (3), that is perpendicular to the holder axis, thus making the power plug (9) move perpendicularly to the A-A axis of the holder.

14 Claims, 6 Drawing Sheets

MOBILE PHONE HOLDER WITH LATERAL CONNECTIONS, ESPECIALLY FOR A MECHANICAL VEHICLE

CROSS-REFERENCE TO RELATED APPLICATIONS

Pursuant to 35 U.S.C. §119 and the Paris Convention Treaty, this application claims the benefit of European Patent Application No. EP08460003 filed Jan. 20, 2008, the contents of which are incorporated herein by reference.

BACKGROUND OF THE INVENTION

1. Field of the Invention

This invention relates to a mobile phone holder provided with a lateral power connector and, if applicable, with lateral signal connectors, for use in mechanical vehicles.

2. Description of the Related Art

Contemporary mobile phones include a plurality of power and signal connectors. Due to a small size of mobile phones, these connectors are generally spread out across all available lateral surfaces. This creates a challenge for developing universal mobile phone holders.

Most commonly used phone holders have power connectors and signal connectors in the lower part and connection with a corresponding socket of the mobile phone is achieved automatically once the phone is inserted into the cavity of the holder where the connectors are located.

WO 9911747 describes a mobile phone holder, having a cavity in the lower part of the body adapted to accommodate a mobile phone. In the upper part of the body, there is a spring-activated catch provided with a rotatably mounted locking bar. The locking bar is pressed by the mobile phone and catches the upper part of the phone pressing it down to the surface of the cavity in the holder.

EP 1 12 893 A1 describes a mobile phone holder, which is provided not only with a signal connector in the lower part but also with an antenna plug, which is located in the upper part of the holder and enters the corresponding socket of the mobile phone when the phone is inserted into the holder.

DE 201 06 566 U1 describes a mobile phone holder, which is provided with a cavity for holding the phone in its lower part. The cavity has signal connectors and power plug connectors and, in its upper part, a slide, which presses the mobile phone towards the cavity and protects it from falling out. To release the slide in order to remove the phone, it is necessary to press the button on its front surface to release the lock. The slide may also be used to adjust the holder to the length of the mobile phone to be inserted.

DE 297 05 230 U1 describes a mobile phone holder, in the lower part of which there is a cavity for holding the phone. In the upper part of the holder, there is a spring-activated catch to prevent the phone from falling out. In the lower part of the holder, there is an elastic antenna plug, which is directed perpendicularly to the bottom of the mobile phone and which enters into the antenna socket in the lower part of the mobile phone automatically when the phone is inserted into the holder. The catch in the upper part of the holder consists of many relatively small parts and is released when the button located in the middle part of the catch is pressed. However, this design does not ensure firm mounting of the phone and increases the production costs of the holder.

DE 10 2006 005 111 A1 describes a mobile phone holder, the lower cavity of which is provided with a signal connector and a power connector. A phone is locked in the holder by means of a sliding element, located slideably in the casing. The phone is mounted in the sliding element. For this purpose the lower part of the sliding element is provided with a cavity to accommodate the mobile phone, whereas the upper part has an elastic catch, which mounts the mobile phone when it is inserted into the holder. Once the sliding element is moved and the phone is mounted, the phone is locked in its "moved" position by means of an additional locking mechanism. The mechanism can be released by pressing the side button in the holder. Additionally, the holder is also provided with an electronic module, which enables cooperation with a hands-free kit installed in the mechanical vehicle.

Known are also mobile phone holders provided with a power cable with a plug, which is inserted into the socket manually after the phone is mounted in the holder.

SUMMARY OF THE INVENTION

The object of this invention is to provide a mobile phone holder for mechanical vehicles, which enables an automatic connection between the power sockets and/or signal sockets on a lateral side of the phone and the corresponding plugs of the phone when it is inserted into the holder.

This goal is achieved by providing a mobile phone holder for a mechanical vehicle, according to the invention, comprising: a base having guides; a cover; a slide adapted for holding the mobile phone, the slide having a power plug with a casing and pins, and a flat protrusion with a guide; and an unlocking module having lateral buttons and an eccentric wheel; wherein the power plug is mounted slideably in the slide; the slide is mounted slideably in the base; the slide and the power plug are slideable perpendicularly to an A-A axis of the holder; the lateral buttons are connected to the eccentric wheel; the guides are inclined with respect to an A-A axis of the holder; and when the lateral buttons are pressed the mobile phone is unlocked, and the casing and the pins are guided along the guides and the cover and along the guide.

In a class of this embodiment, or in another embodiment, the holder comprises further signal plugs, the casing of the power plug serves also as a casing for the signal plugs, and the signal plugs are adapted to engage with sockets disposed on a lateral surface of the mobile phone.

In a class of this embodiment, or in another embodiment, the holder comprises further a catch with a spring; the slide is provided with an insert, the insert being mounted slideably in the slide in the parallel direction; and the catch is mounted on the insert and is adapted to hold an upper edge of the mobile phone.

In a class of this embodiment, or in another embodiment, the catch further comprises a blocking protrusion; the unlocking module further comprises a body with protrusions having guides; and the blocking protrusion is adapted to engage the guides and to block the catch when the slide is in its lowest position with respect to the base.

In a class of this embodiment, or in another embodiment, the slide comprises further a plate having a hole; the protrusion is provided with a slot; a guide pin is mounted slideably in the hole, is guidable perpendicularly to the surface of the plate in the slot, and is adapted to release the protrusion when the mobile phone is inserted into the holder, whereby causing the slide to move to its lowest position with respect to the base.

In a class of this embodiment, or in another embodiment, the unlocking module comprises a body having expanded arms, the expanded arms serving as guides for the slide.

In a class of this embodiment, or in another embodiment, the cover is provided in its lateral part with a guide inclined with respect to the A-A axis of the holder, analogously to the guide, and adapted to guide the pin.

In a class of this embodiment, or in another embodiment, the plate is provided with an antenna plug.

The performance tests of the mobile phone holder for mechanical vehicles, according to the invention, showed that due to its design the holder allows for secure mounting of (a) mobile phones with power sockets and, if applicable, with signal sockets on the lateral side and (b) mobile phones provided with power sockets on the lateral side, signal sockets on the bottom side, and an antenna socket on the rear side. The holder ensures in particular a firm mounting and a correct connection between the phone and electronic or electric devices of the mechanical vehicle.

BRIEF DESCRIPTION OF THE DRAWINGS

The mobile phone holder for a mechanical vehicle, according to the invention, is presented by way of the example only in the drawings, in which.

DETAILED DESCRIPTION OF THE EMBODIMENTS

Detailed description will be given below with reference to accompanying drawings.

The holder is designed for a mobile phone, in which the signal is transferred from the holder to a hands-free kit via a wireless connection (e.g., BLUETOOTH), and especially to a mobile phone T provided with a power socket and, possibly, with a signal socket located on the lateral surface of the phone.

Figure 1:
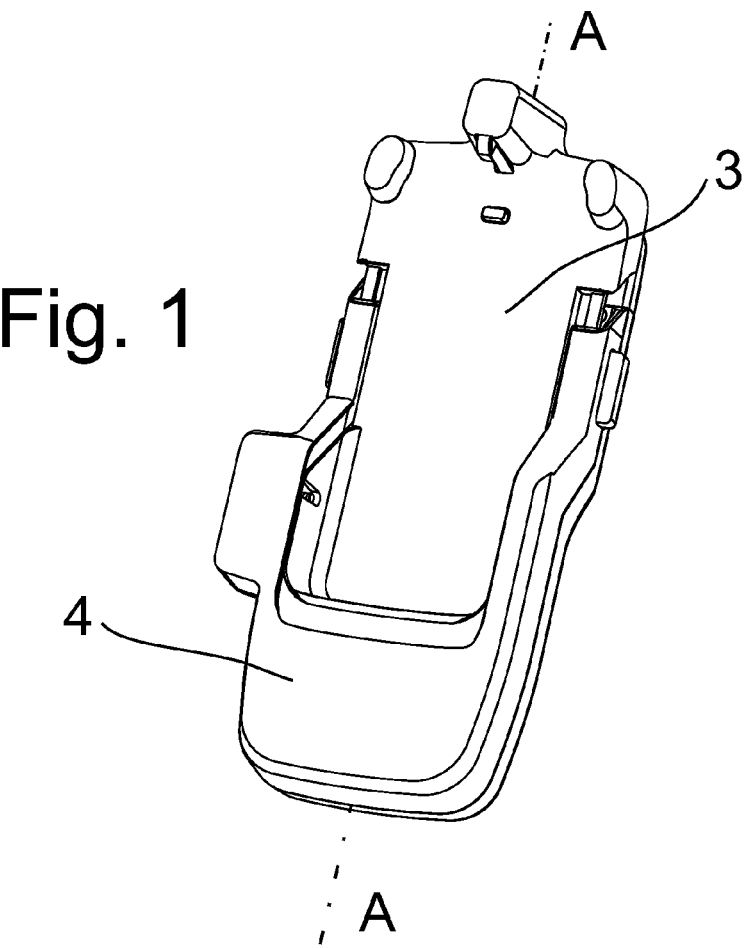
FIG. 1 is a perspective view of the holder mounted within a mechanical vehicle according to a representative embodiment of the invention.
Figure 2:
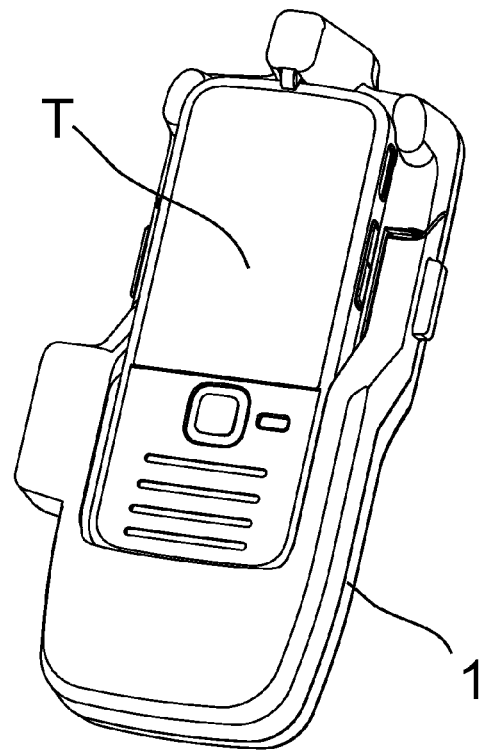
FIG. 2 is a perspective view of the holder, shown in FIG. 1, with a mobile phone in it, provided with power sockets on its left lateral side according to a representative embodiment of the invention.
Figure 3:
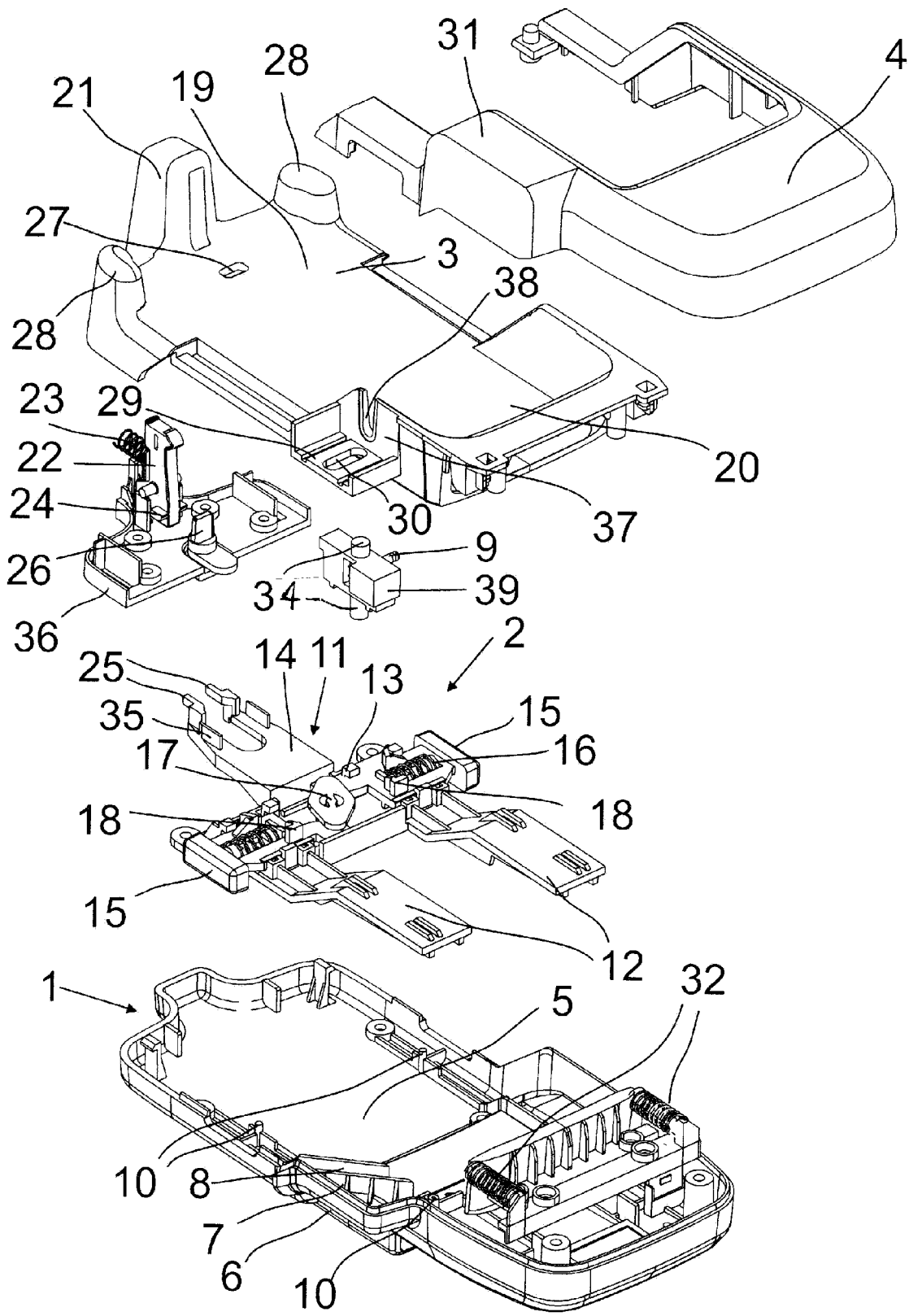
FIG. 3 is an exploded view of the components of the holder, shown in FIG. 1, according to a representative embodiment of the invention.

As shown in FIGS. 1 to 3, the mobile phone holder, according to the invention, comprises the following key components: a base 1, a slide 3, a module unlocking the slide 2, and a cover 4.

The base 1 of the holder comprises a lower plate 5, the edges of which protrudes upwards and the lower part of which is connected with a mounting element 6 for mounting the holder on a rack within a mechanical vehicle. On the lower plate 5 there is an electronic module installed, not depicted in the drawing, which is adapted to provide a connection between the holder and electronic or electric devices within a vehicle. On one side of the base 1, there is provided a protrusion 7, which is also the edge of the base 1, with a guide 8 inclined to the A-A axis at an acute angle and adapted to guide the casing 39 of the power plug 9 and, if applicable, a signal plug, which is not depicted in the drawing.

On the base 1 there is provided an unlocking button-type module 2, which is firmly mounted and which is located by means of the pins 10 in the base 1. This module comprises a body 11, which has a shape of two arms 12, connected with a cross bar 13 provided with a protrusion 14 and two buttons 15, which are mounted slideably and perpendicularly to the holder axis and which are provided with springs 16, and which are connected to each other eccentrically by means of a wheel 17.

The arms 12 of the body 11, directed upwards are the guides, along which the slide 3 moves. The buttons 15 are provided with teeth 18, which are adapted to engage with the corresponding catches of the slide 3, resulting in the slide being blocked when the catches are drawn aside. Movement of the teeth towards the A-A axis of the holder, caused by pressing the buttons 15, results in releasing the slide 3 and allowing its move in relation to the holder, upwards or downwards, along the arms 12 of the unlocking module 2. Releasing the buttons 15 results in their return, facilitated by the springs 16, to the position of protruding from the holder.

The slide 3 has a shape of the plate 19, which is provided in its lower part with a cavity 20, where the mobile phone can be placed, whereas in it upper part there is provided a protrusion 21, inside which there is a catch 22, mounted rotatably in an insert 36 located under the plate and having a form of a plate with supports. The rotatably mounted catch 22 is pressed down by means of a spring 23 to the upper edge of the mobile phone T.

The catch 22 is provided with lateral protrusions 24, which are adapted to engage with guides 25, located at the end of the protrusion 14 of the unlocking module 2 and designed to block the catch 22 in a position where the mobile phone T is locked.

The insert 36 is additionally provided with a pin 26, protruding from its center; the pin 26 is mounted slideably in a slot between the guides 25 of the protrusion 14 of the unlocking module 2 and then goes through the hole 27 of the slide. This pin prevents the slide from being moved when the pin is not pressed by the mobile phone. This blocking arrangement protects the power plug 9 from being broken in case of an attempt to insert a mobile phone into the holder when slide 3 is moved down. The plate 19 of the slide 3 is also provided with two protruding corners 28, which hold the mobile phone in the slide.

Figure 4:
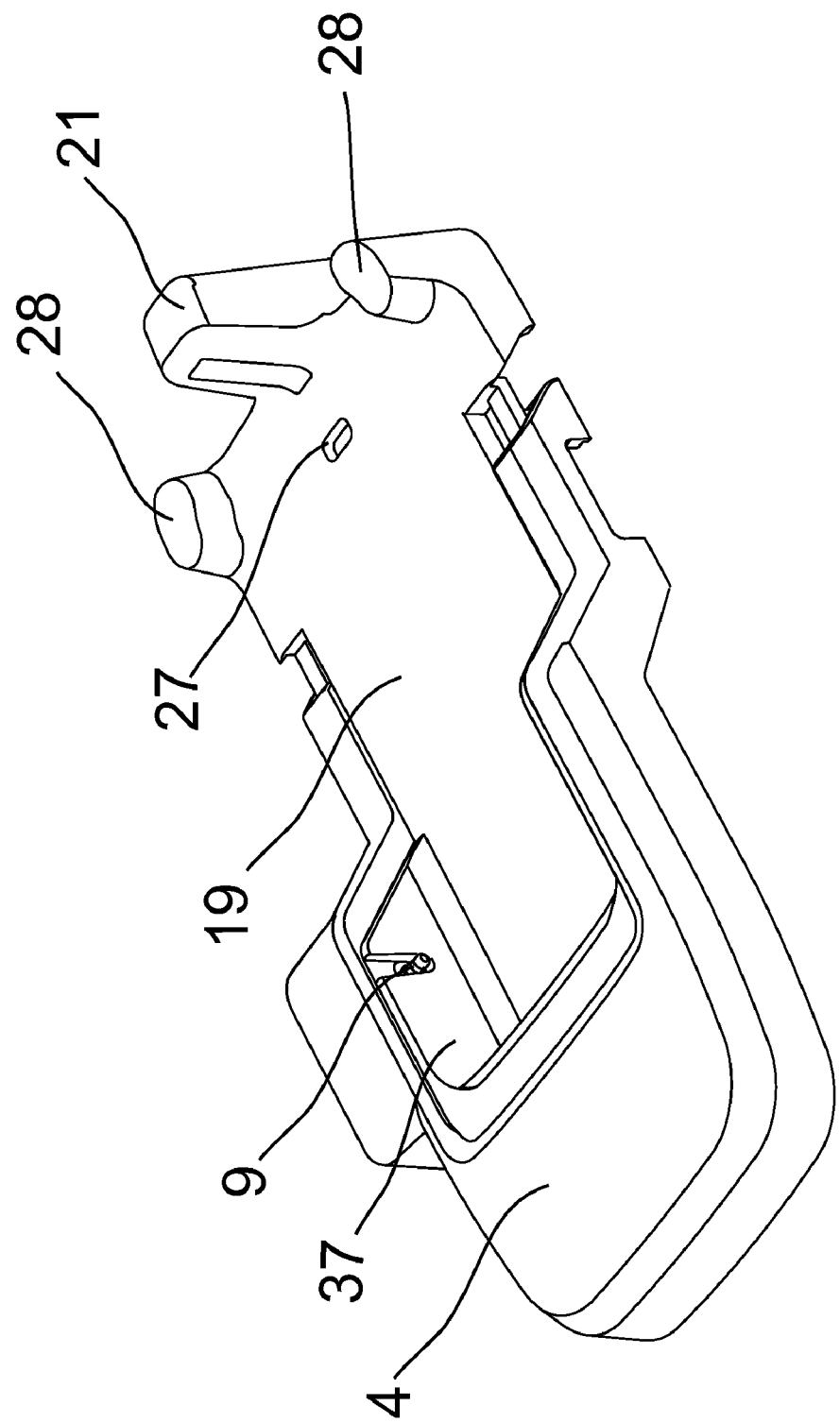
FIG. 4 is a perspective view of the slide of the holder with a cover according to a representative embodiment of the invention.
Figure 5:
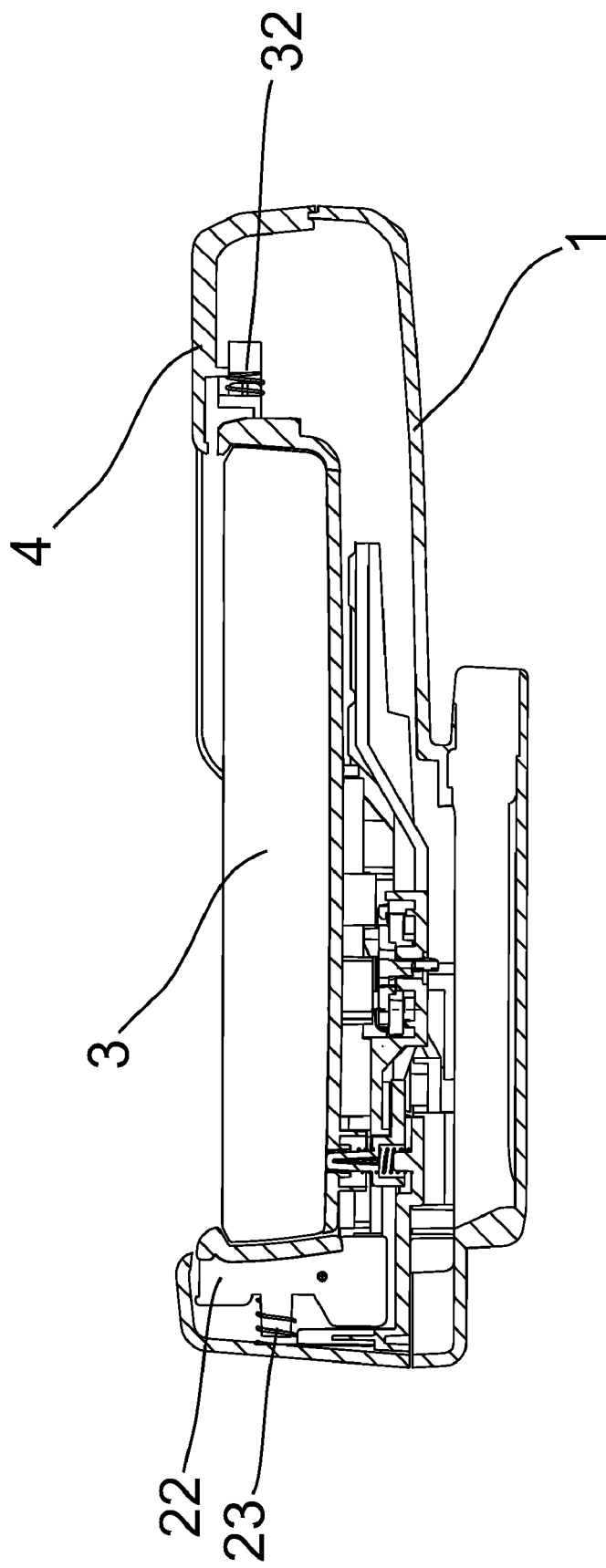
FIG. 5 is an axial section of the holder, along the A-A axis as shown in FIG. 1, according to a representative embodiment of the invention.
Figure 6:
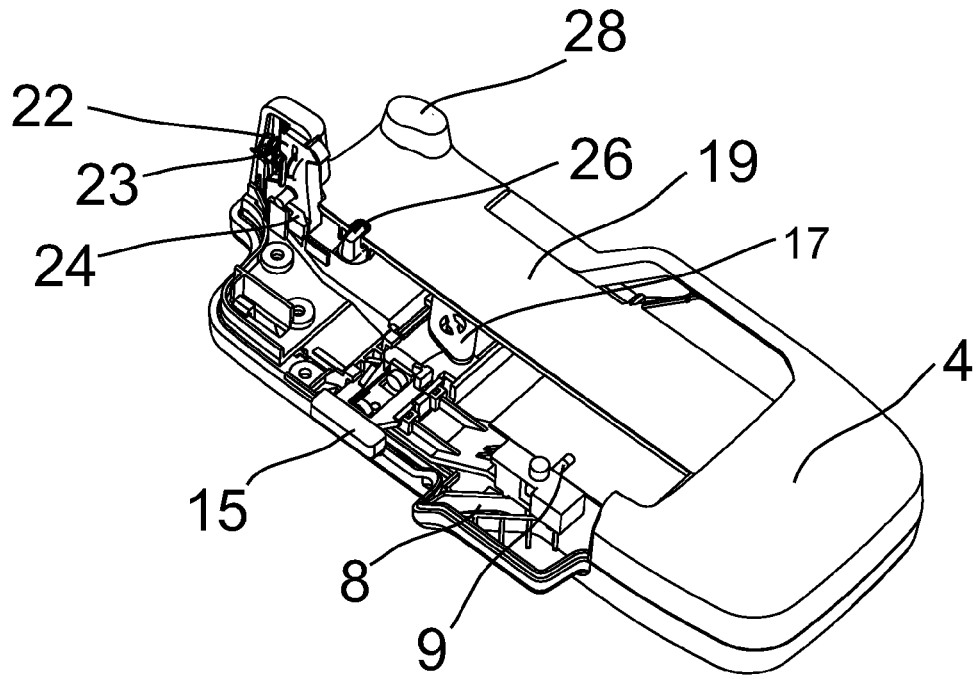
FIG. 6 is a perspective view of an axial section of the holder as shown in FIG. 1, with the cover and the slide removed, according to a representative embodiment of the invention.

As shown in FIG. 4, in the lower part of the plate 19, there is a protrusion 29 with a guide 30 for the casing 39 of the power plug 9. Within this protrusion the edges of the plate 19 form a vertical wall 37 with a hole 38, through which the power plug 9 crosses.

The casing 39 of the power plug 9 is made of a material providing electric insulation, particularly plastic, and both—the lower and the upper pin 34 are mounted slideably in two guides. The lower pin 34 is guided concurrently along the longitudinal guide 30 of the flat protrusion 29, which is perpendicular to the A-A axis of the holder and along the first guide 8 of the base 1, inclined at an acute angle to the A-A axis of the holder. The other pin 34 is guided along a guide in the protrusion 31 in the cover 4, not depicted in the drawing and corresponding to and inclined at the same angle to the A-A axis as is the guide 8.

The motion of the slide along the holder axis results in a perpendicular motion of the casing 39 of the power plug 9, which makes the power plug 9 protrude from the hole 38 in the vertical wall 37 of the slide 3 and enter into the socket of the mobile phone T.

The shape of the lower part of the cover 4 of the holder is the same as the shape of the cavity 20 of the slide 3, and at the inside of the cover 4 there are guides for the slide 3, not depicted in the drawing.

Figure 7:
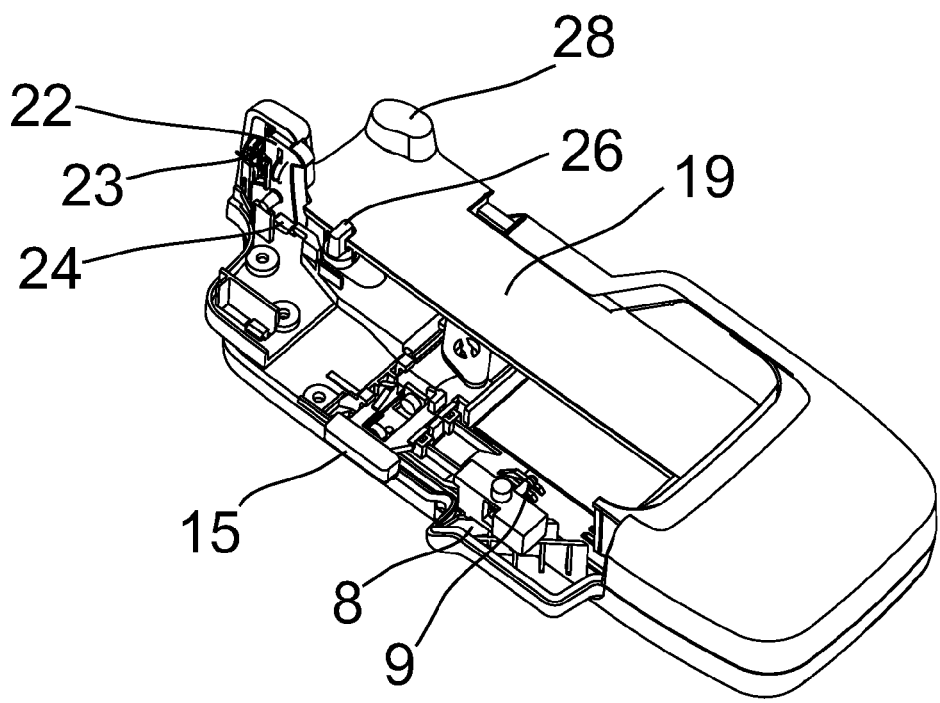
FIG. 7 is a perspective view of an axial section of the holder as shown in FIG. 1, in a released position, according to a representative embodiment of the invention.

The mobile phone holder, according to the invention, operates as follows:

In a released position, as shown in FIGS. 1 and 7, the slide 3 of the holder is in its upper location. When the lower part of the mobile phone is inserted into the cavity 20 and the upper part of the mobile phone is pressed down to the plate 19 of the slide, the phone pushes the pin 26 thus unblocking the holder. At the same time, the catch 22 blocks the mobile phone in the slide 3. Next, the slide 3 with a mobile phone in it moves downwards, which results in the guides 25 of the unlocking module 2 pressing the protrusions 24 of the catch 22, which is blocked in the lower position, locking the mobile phone. At the same time, during the motion, the guides 8 and the guide 30 have an effect on the pin 34 of the casing 39 and make the power plug 9 protrude and enter the power socket on the lateral side of the mobile phone T.

Analogously, similar guides may make the signal plug protrude and enter the signal socket on the lateral side of the mobile phone.

If a mobile phone is provided with sockets both on the lateral side and the bottom side, and the holder is provided with such plugs in the lower part of the base 1; moving the phone in a slide 3 downwards results in the plugs in the base 1 entering into the socket of the phone.

In order to release and remove a mobile phone from the holder it is necessary to press both buttons 15 of the unlocking module 2 towards the A-A axis of the holder. This results in a corresponding move of the teeth 18 and release of the catches on the bottom side of the plate 19 of the slide 3. As a result of a release of the slide 3, its return springs 32 make the slide 3 with the phone in it move automatically upwards to its uppermost, released position. Concurrently, while the slide 3 is moving upwards, the inclined guide 8 and the guide 30 have an effect on the pins 34 of the casing 39, and the power plug 9 and, if applicable, other signal plugs, slides out from the corresponding sockets on the lateral side of the phone. At the end phase of this move and when the slide 3 is in its uppermost position, the catch 22 is released, thus enabling the phone to be removed from the holder. Removing the phone from the holder results in the release of the pin 26, which blocks the holder.

The embodiment of the holder presented here enables safe mounting of a mobile phone in it, without a risk of the lateral power plug 9 or, if applicable, other lateral signal plugs, being broken.

Figure 8:
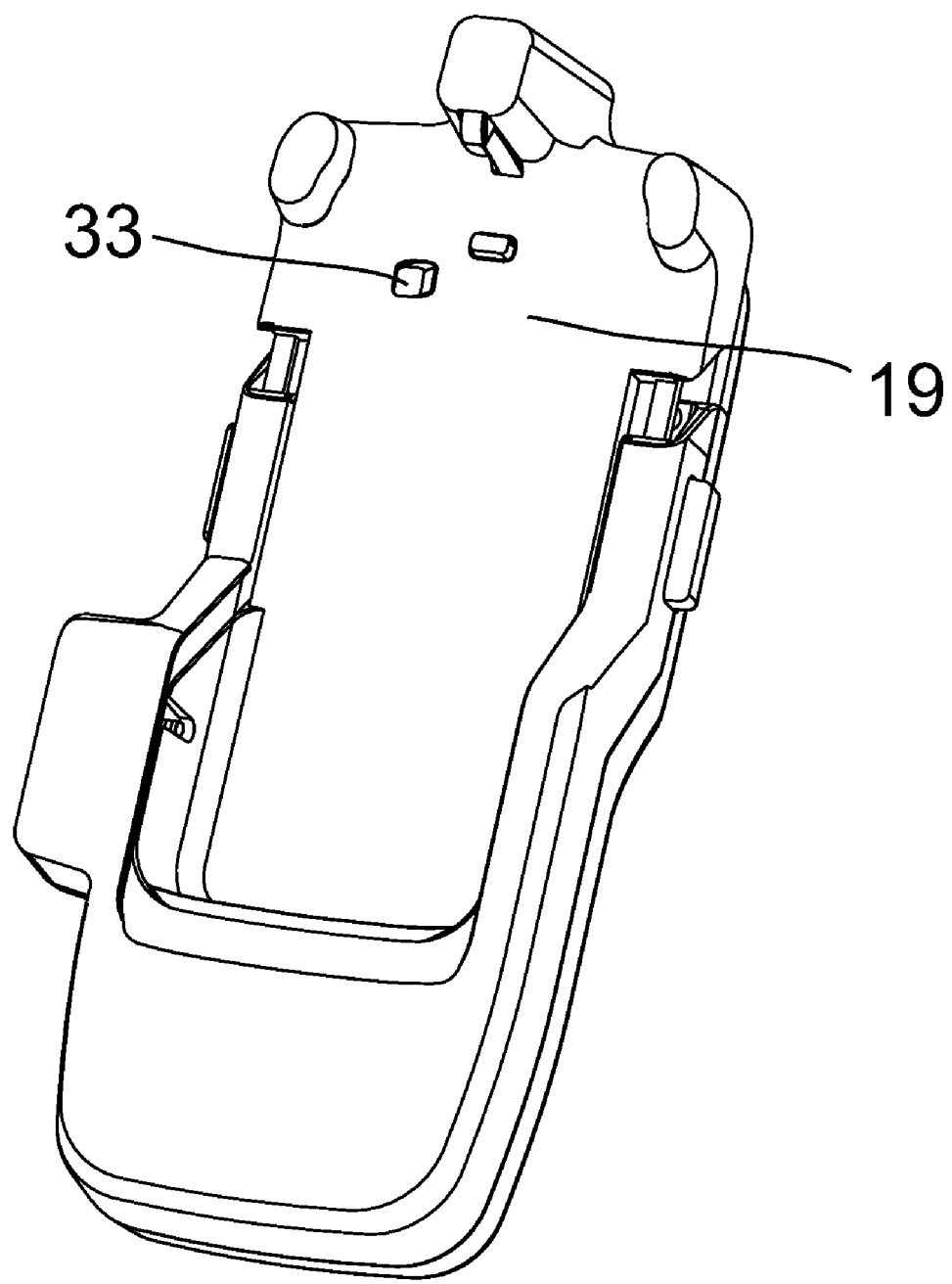
FIG. 8 is a perspective view of the holder provided with an additional antenna plug located on the slide according to a representative embodiment of the invention.

FIG. 8 shows another embodiment of the holder, according to the invention, where the holder is provided with an additional antenna plug 33, mounted elastically in the plate 19 of the slide 3. This plug automatically enters the corresponding antenna socket located on the rear side of the mobile phone.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

The invention claimed is:

1. A holder for a mobile phone having sockets disposed on a lateral surface, said holder comprising: a base (1) having guides (8); a cover (4); a slide (3) adapted for holding the mobile phone, said slide (3) having a power plug (9) with a casing (39) and pins (34), and a flat protrusion (29) with a guide (30); an unlocking module (2) having lateral buttons (15) and an eccentric wheel (17); and a catch (22) with a spring (23); wherein said power plug (9) is mounted slideably in said slide (3); said slide (3) is mounted slideably in said base (1); said slide (3) and said power plug (9) are slidable perpendicularly to an A-A axis of the holder; said slide (3) is provided with an insert (36), said insert (36) being mounted slideably in said slide (3) in the parallel direction; and said catch (22) is mounted on said insert (36) and is adapted to hold an upper edge of the mobile phone; said lateral buttons (15) are connected to said eccentric wheel (17); said guides (8) are inclined with respect to an A-A axis of the holder; and when said lateral buttons (15) are pressed the mobile phone is unlocked, and said casing (39) and said pins (34) are guided along said guides (8) and said cover (4) and along said guide (30).

2. The holder according to claim 1 comprising further signal plugs, wherein the casing (39) of the power plug (9) serves also as a casing for said signal plugs, and said signal plugs are adapted to engage with sockets disposed on a lateral surface of the mobile phone.

3. The holder of claim 1, wherein said catch (22) further comprises a blocking protrusion (24); said unlocking module (2) further comprises a body (11) with protrusions (14) having guides (25); and said blocking protrusion (24) is adapted to engage said guides (25) and to block said catch (22) when said slide (3) is in its lowest position with respect to said base (1).

4. The holder of claim 3, wherein said slide (3) comprises further a plate (19) having a hole (27); said protrusion (14) is provided with a slot (35); a guide pin (26) is mounted slideably in said hole (27), is guidable perpendicularly to the surface of the plate (19) in said slot (35), and is adapted to release said protrusion (14) when the mobile phone is inserted into the holder, whereby causing said slide (3) to move to its lowest position with respect to said base (1).

5. The holder of claim 4, wherein said plate (19) is provided with an antenna plug (33).

6. The holder of claim 1, wherein said unlocking module (2) comprises a body (11) having expanded arms (12), said expanded arms (12) serving as guides for said slide (3).

7. The holder of claim 1, wherein said cover (4) is provided in its lateral part with a guide (31) inclined with respect to the A-A axis of the holder, analogously to said guide (8), and adapted to guide said pin (34).

8. A holder for a mobile phone having sockets disposed on a lateral surface, said holder comprising: a base (1) having guides (8); a cover (4); a slide (3) adapted for holding the mobile phone, said slide (3) having a power plug (9) with a casing (39) and pins (34), and a flat protrusion (29) with a guide (30), said slide (3) having an insert (36) being mounted slideably in said slide (3) in the parallel direction, wherein said insert (36) has a catch (22) with a spring (23) being mounted thereon and adapted to hold an upper edge of the mobile phone; and an unlocking module (2) having lateral buttons (15) and an eccentric wheel (17); wherein said power plug (9) is mounted slideably in said slide (3); said slide (3) is mounted slideably in said base (1); said slide (3) and said power plug (9) are slideable perpendicularly to an A-A axis of the holder; said lateral buttons (15) are connected to said eccentric wheel (17); said guides (8) are inclined with respect to an A-A axis of the holder; and when said lateral buttons (15) are pressed the mobile phone is unlocked, and said casing (39) and said pins (34) are guided along said guides (8) and said cover (4) along said guide (30).

9. The holder of claim 8 comprising further signal plugs, wherein the casing (39) of the power plug (9) serves also as a casing for said signal plugs, and said signal plugs are adapted to engage with sockets disposed on a lateral surface of the mobile phone.

10. The holder of claim 8, wherein said catch (22) further comprises a blocking protrusion (24); said unlocking module (2) further comprises a body (11) with protrusions (14) having guides (25); and said blocking protrusion (24) is adapted to engage said guides (25) and to block said catch (22) when said slide (3) is in its lowest position with respect to said base (1).

11. The holder of claim 10, wherein said slide (3) comprises further a plate (19) having a hole (27); said protrusion (14) is provided with a slot (35); a guide pin (26) is mounted slideably in said hole (27), is guidable perpendicularly to the surface of the plate (19) in said slot (35), and is adapted to release said protrusion (14) when the mobile phone is inserted into the holder, whereby causing said slide (3) to move to its lowest position with respect to said base (1).

12. The holder of claim 11, wherein said plate (19) is provided with an antenna plug (33).

13. The holder of claim 8, wherein said unlocking module (2) comprises a body (11) having expanded arms (12), said expanded arms (12) serving as guides for said slide (3).

14. The holder of claim 8, wherein said cover (4) is provided in its lateral part with a guide (31) inclined with respect to the A-A axis of the holder, analogously to said guide (8), and adapted to guide said pin (34).

* * * * *